(12) United States Patent
Moore

(10) Patent No.: US 8,152,427 B2
(45) Date of Patent: Apr. 10, 2012

(54) THREADED FASTENER SHAFT HAVING A DEFORMABLE THREADED PORTION

(75) Inventor: Simon Garry Moore, Cambridge (NZ)

(73) Assignee: Puku Limited, Cambridge (NZ)

( * ) Notice: Subject to any disclaimer, the term of this patent is extended or adjusted under 35 U.S.C. 154(b) by 710 days.

(21) Appl. No.: 12/162,094

(22) PCT Filed: Jan. 23, 2007

(86) PCT No.: PCT/NZ2007/000014
§ 371 (c)(1),
(2), (4) Date: Dec. 8, 2008

(87) PCT Pub. No.: WO2007/086761
PCT Pub. Date: Aug. 2, 2007

(65) Prior Publication Data
US 2009/0169330 A1    Jul. 2, 2009

(30) Foreign Application Priority Data
Jan. 24, 2006   (NZ) ........................................ 544906

(51) Int. Cl.
*F16B 39/04*   (2006.01)
(52) U.S. Cl. ........................................ 411/301; 411/304
(58) Field of Classification Search .......... 411/301–304; 470/906
See application file for complete search history.

(56) References Cited

U.S. PATENT DOCUMENTS

| | | | | |
|---|---|---|---|---|
| 234,967 A | | 11/1880 | Courtenay | |
| 1,893,067 A | * | 1/1933 | Arenz | 411/304 |
| 2,360,531 A | | 10/1944 | Wojtan | |
| 2,409,638 A | * | 10/1946 | Lyon | 411/304 |
| 2,539,887 A | | 1/1951 | Boots | |
| 2,570,658 A | * | 10/1951 | Farrell et al. | 411/304 |
| 2,663,344 A | * | 12/1953 | Burdick | 411/302 |
| 2,815,787 A | * | 12/1957 | Podell | 411/304 |
| 3,144,066 A | * | 8/1964 | Van Hecke | 411/304 |
| 3,150,702 A | * | 9/1964 | Buckley et al. | 411/304 |
| 3,221,790 A | * | 12/1965 | Poupitch | 411/301 |
| 3,285,310 A | * | 11/1966 | Boots et al. | 411/301 |
| 3,474,845 A | * | 10/1969 | Podell | 411/302 |
| 3,488,666 A | | 1/1970 | Podell | |
| 3,523,565 A | | 8/1970 | Olsen | |
| 3,670,794 A | * | 6/1972 | Beidler | 411/303 |
| 4,019,550 A | | 4/1977 | DeHaitre | |
| 5,407,312 A | | 4/1995 | Terrizzi | |
| 5,595,466 A | | 1/1997 | DeHaitre | |

FOREIGN PATENT DOCUMENTS

| | | |
|---|---|---|
| DE | 30 41 371 A1 | 5/1981 |
| GB | 1 223 462 | 2/1971 |
| GB | 1 347 783 | 2/1974 |
| GB | 2 062 791 A | 5/1981 |

* cited by examiner

*Primary Examiner* — Flemming Saether
(74) *Attorney, Agent, or Firm* — Greer, Burns & Crain, Ltd.

(57) ABSTRACT

A fastening mechanism including a shaft, wherein the shaft is effectively threaded; the shaft includes a threaded non-deformable material interspersed with at least one portion of a threaded deformable material.

10 Claims, 4 Drawing Sheets

THREADED FASTENER SHAFT HAVING A DEFORMABLE THREADED PORTION

TECHNICAL FIELD

This invention relates to a friction mechanism.

More specifically, the present invention relates to friction mechanisms which are variations on fastener mechanisms.

More specifically, the present invention relates to variations of fastener mechanisms which are configured to limit the effect of vibration.

BACKGROUND ART

The present invention relates particularly to fastener mechanisms such as bolts and screws.

For ease of general reference both bolts and screws are understood to include a head and a threaded shaft. Bolts tend to differ from screws in that bolts tend to have an even cross-section throughout the shaft (excluding the effect of the threads) whereas screws tend to be tapered to a point at the end of the shaft distal to the head. As can be appreciated there are many thousands of variations on bolts and screws to which the principles of the present invention can be applied.

It should be appreciated that the fastener industry is internationally estimated at being worth US $40 billion per annum.

One of the major disadvantages with current bolts is that it is estimated that approximately 50% of mechanical failures occur as a consequence of nuts and bolts shaking loose.

An extreme example of such failures is the crash of a Concorde at Charles De Gaulle Airport in Paris. This occurred because a small metal strip fell off a DC10 plane onto the runway.

There have been numerous attempts and many patents filed which discuss the efforts of parties around the world to invent a fastening mechanism in the form of a bolt that strongly secures elements together but does not shake loose with vibration.

One example of a product developed to decrease the effect of vibration on screws and bolts is the Nylok product, Blue® Patch.

This product includes a thin patch which is spray bonded onto the threads of a fastener. The patch then acts as a self locking element.

The principle behind the patches is that when mating threads are engaged the self locking patch element is compressed and a counterforce is created to establish a stronger metal to metal contact, and thus provide increased resistance to vibration and loosening.

This product however has a number of significant disadvantages, these include the following:

One disadvantage is that although the patch is meant to be 'permanently' spray bonded onto the threads of a fastener, the patch may become separated from or tatty with repeated use. The patch once applied to the thread covers the entire thread in the area applied, including the protrusions and depressions of the thread. The patch is highly prone to permanent deformation or deterioration in use. This is especially the case when mis-threading occurs or when bolts or screws are tightly fitted into their opposite member a number of times. Any separation of the patch decreases the effect of the patch, and may result in uneven action or failure of the patch.

Where a part is disassembled for inspection or maintenance, it is advantageous if the fastener used does not deteriorate in anti-vibration efficacy with each use, and a Blue® Patch is prone to do so.

A further significant disadvantage of these patches is that at high or sustained vibration levels the patch effectiveness may be decreased. This may be due to the thinness of the patch material, detachment of the patch under these conditions, or lack of resilience in the patch material.

These problems significantly reduce the reliability and reusability of this product.

The same technology as that employed in the Nylok® Blue® Patch has also been applied to the interior thread of nuts which are then fitted over bolts.

The same problems as discussed above apply in this situation.

Long-Lok Fasteners Corporation is another company which provide patches for fasteners such as their product Poly-Lok®. These also have the same disadvantages as discussed above.

Long-Lok Fasteners Corporation also has a product which is sold under the name of Long-Lok®. This is a bolt which has a strip cut into its longitudinal axis. The cut is then filed with a vibration resistant material such as Nylon or Kel-F®.

This material is highly subject to deterioration as it is "cut" into by the complementary thread into which the bolt is done up or undone from. Repeated use of the bolt can therefore significantly decrease the effect of the material to dampen the effect of vibration which is required to prevent the bolt from loosening.

One significant disadvantage with this product is that the Nylon or Kel-F® material is placed under considerable forces as the bolt is done up, or a nut is placed on same. This can significantly weaken the material and decrease the effectiveness and reusability of the product.

A further disadvantage is that due to the material being positioned along a longitudinal axis of the bolt, the material may only be effective in decreasing the effect of vibration when the vibration is from a particular angle, for example when the vibration is in the same plane as the material is positioned.

The position of the material along the longitudinal axis of the thread leads to non-uniform deformation along the length of the material. For example, a protrusion or a depression on the complementary thread to the bolt will lead to differing deformation on adjacent portions of the material. This non-uniform deformation is unreliable, and decreases usability.

Other disadvantages, discussed above in relation to a patch sprayed onto the threads also apply to this product.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a fastening mechanism including a shaft, wherein the shaft is effectively threaded,
the fastening mechanism characterised in that
the shaft includes a threaded non-deformable material interspersed with at least one portion of a threaded deformable material.

Throughout this specification the term 'shaft' can be taken as meaning either the exterior surface of a length of material, such as the shaft of a bolt or screw, or the interior surface of a hollow shaft, such as in a nut. The term nut should be taken to mean a hollow shaft, wherein the internal surface is configured to interact with complementary threads on a bolt or screw.

Throughout this specification reference will herein be made to the shaft being the exterior surface of a bolt or screw (herein referred to as a bolt), which is the preferred embodiment of the present invention.

It should be appreciated that when the shaft is in the form of a bolt, the shaft may also include a head.

Alternatively, both the bolt and a corresponding nut may have at least one portion of a threaded deformable material interspersed with the non-deformable threaded material.

It is envisaged that the principles behind the fastening mechanism of the present invention can be used in a variety of situations and with a variety of fastening mechanisms. For ease of reference however the fastening mechanism shall be referred to as a bolt. It should be appreciated however that this is not intended to be limiting.

It should also be appreciated that the present invention could cooperate with either complementary threads (such as in a nut) or directly into a material such as wood, concrete, metal, plastic or any other material.

The head of the fastening mechanism of present invention may be of any shape or configuration required for the bolt to be "done up" or "undone". For example, in one embodiment the head may be hexagonal with sides of a shape and size designed to cooperate with standard spanners and the like.

In other embodiments, the head may be designed to cooperate with various screw drivers, such as a chisel, flat head or Philips head.

In other embodiments the head may have a recess which is designed to cooperate with the end of an Allen key.

The main purpose of the head is to provide something for the shaft to fit onto and the user to rotate with the appropriate tools for the situation to 'do up' or 'undo' the fastening mechanism.

Likewise, the shaft may be of any length or thickness suitable for the particular application in which it is intended to be used.

In most embodiments it is envisaged that the shaft will be substantially straight and abut the head at substantially right angles thereto. While this should not be seen as limiting, it should be appreciated that this is a standard configuration used for most bolts and screws, being the most practical.

The term "effectively threaded" should become more apparent in the following descriptions of the construction of the shaft. However, the aim of the present invention is to be able to provide a bolt or screw which has external threads able to cooperate with either complementary threads or materials in a similar manner to existing bolts and screws. Generically, a thread in the present invention is at least one spiral ridge extending along the shaft.

With a conventional bolt or screw the shaft is a solid piece of material into which at least one spiral ridge or thread has been cut. This configuration means that the length and diameter of the shaft remains substantially constant both before and when in use as there is no flexure, compression, or extension provided for in the design.

This means that for a bolt to cooperate with a nut, the fit between the complementary threads has to be loose enough to allow the nut and bolt to be readily done up with respect to each other, yet tight enough to ensure that vibration of the bolt does not cause the nut to shake loose. As discussed previously this is a significant problem with the prior art.

Meeting these requirements and the very fine tolerances required is understandably very difficult.

Throughout this specification the term non-deformable material should be taken as meaning a material which is unable to deform from its original shape, and which has no material memory.

In a preferred embodiment the non-deformable material may be any material from which existing screws, bolts or other fastening mechanisms are formed.

Throughout this specification the term deformable material should be taken as meaning a material which is able to deform from its original shape, and has a resilience or bias to return to its original shape, i.e the deformable material has a material memory.

In a preferred embodiment the deformable material has a high co-efficient of friction. This helps in the action of the fastening mechanism of the present invention to hold it in place, and prevent movement or shaking loose due to vibration.

In a preferred embodiment the deformable material may be rubber, nylon, elastomer, or any other natural or synthetic compound.

Throughout this specification the term interspersed should be taken as meaning that the shaft includes alternating portions or segments of both non-deformable threads and deformable threads. Alternatively, the term interspersed can mean that a threaded shaft of non-deformable threads includes at least one portion of non-deformable thread.

Throughout this specification the term integral should be taken as meaning that both the non-deformable and deformable threads are required to form the threaded shaft of the fastening mechanism.

Throughout this specification the term non-deformable should be taken as meaning non-deformable relative to the deformable portions or threads.

In a preferred embodiment the non-deformable threads are substantially the same as in a conventional bolt or screw. Usually, each individual thread ends in a taper, which fits into and moves along a corresponding depression in the complementary thread.

In one embodiment the deformable threads may be substantially the same shape as the non-deformable threads, i.e. substantially tapered in shape, which fit into and move along corresponding depressions in the complementary thread.

In an alternative embodiment the deformable threads may have a different shape, such as rounded or U-shaped.

The nature of the deformable material is such that these shapes will deform to fit into and move along the standard angle depression on the complementary thread. The bias of the deformable material memory towards its original shape and position then provides increased friction of the threaded shaft with its complementary thread. This additional deformation may increase the surface area of the deformable material in contact with the complementary thread and therefore increase the friction fit, and increase resistance to vibration.

As, in these embodiments, the deformable threads only differ in the specific shape of the thread they do not undergo non-uniform forces. The entire portion of deformable thread is subject to the same forces as it moves along the corresponding depression on the complementary thread. This means that the deformable threads of the present invention are unlikely to peel, or be cut into like the patches in the prior art products previously discussed.

In a preferred embodiment the deformable material has a thread pattern which substantially matches and fits in with the rest of the threaded shaft. This allows the fastening mechanism to act in its normal manner.

In one preferred embodiment the threads or portions of threads of a deformable material may extend around substantially the entire circumference of the shaft at least once.

This may be in the form of either of the following:
1. The deformable material extends across a cross section and along a portion of the length of the shaft, the thread pattern matching and fitting with the rest of the threaded shaft. In this instance the shaft may be segmented into threads of non-deformable or deformable material, or
2. The deformable material thread(s) extends in the manner of (and is in the place of) at least one thread along the entire length, or a portion thereof of the shaft.

In another preferred embodiment the threaded shaft may be configured such that the non-deformable threads may be intermittently interspersed with at least one deformable material portion for at least part of the helical thread of the non-deformable thread. In this embodiment the deformable material is again configured in a thread pattern matching and fitting with the thread on the rest of the threaded shaft.

This is a version of number 2 above, wherein the deformable material extends in the manner of (and is in place of) at least a portion of at least one thread of the shaft, for example on one or more sides of the shaft, at regular intervals along the shaft.

This embodiment could also simplify use of the fastening mechanism. This is because this embodiment may utilise a 1 start helix thread. This is consistent with commonly used tapped complementary threads.

In alternative embodiments where a thread with a 2 or more start helix is used, a specifically tapped complementary thread may be required to provide the corresponding complementary thread.

This configuration of the deformable material in the manner of a thread allows the deformable material to deform in a direction generally towards the central axis of the shaft.

As the deformation in the present invention is substantially inwards on itself towards the central axis of the shaft the deformable material is under less stress, and stress of a more predictable nature than if the deformation was in a substantially sideways action, as in the prior art products. This allows greater deformation to occur without physical deterioration, thereby increasing the utility and longevity of the present invention. This is in direct contrast to the prior art previously discussed, and overcomes the reliability problems and deterioration which the prior art is prone to. For example the Long Lok product (Poly-Lok) with material inserted along the longitudinal axis which is not in a thread like pattern would undergo sideway stresses and deformation as the shaft is rotated to do up or undo the shaft. Similarly the Nylok patch undergoes stress from one side of the patch to the other as the shaft is rotated to do up or undo.

In a preferred embodiment the threaded shaft of non-deformable and deformable material may be in the form of a 1 start helix. This is where one helix starts at one end of the shaft and thread around the shaft along its length.

Alternatively, especially where the threaded shaft is made up of alternating or interspersed separate threads of non-deformable and deformable material the threaded shaft may be in the form of a two or more start helix. This is where two of more helixes start at one end of the shaft and thread around the shaft along its length.

In a preferred embodiment at least one external dimension of the deformable thread may be greater than that of adjacent non-deformable threads. This also means that at least one external dimension of the deformable thread may be greater than the corresponding depression in the complementary thread.

This may be via the following:

In one preferred embodiment the deformable threads may have a greater cross sectional length than the non-deformable threads on either or one side.

This results in the deformable threads extending further from the central axis of the shaft than the adjacent non-deformable threads.

This provides a significant advantage in that the deformable threads can compress during fastening of the mechanism, and then the bias of the material memory towards their original shape and position provides increased friction of the threaded shaft with its complementary thread. This increases the vibration resistance of the fastening mechanism of the present invention.

In an alternative embodiment, the deformable threads may have a greater cross sectional width than the non-deformable threads on either or one side, while still maintaining the same thread spacing and pattern as the rest of the threaded shaft. This may for example be via the deformable thread having a substantially rounded or U-shape, rather than a tapered shape, as discussed above.

As above, this again leads to compression during fastening, and then the bias of the material memory towards the original shape and position provides increased friction of the threaded shaft with the complementary thread.

In a further embodiment of the present invention the deformable threads may have both a greater cross sectional length and width than adjacent non-deformable threads.

In this way the threaded deformable material tends to bind to the complementary threaded element (the nut threads in the case of an insert bolt), thereby providing significantly increased vibration resistance.

In a preferred embodiment the deformable material is compressible and deforms as the thread rotates. Once the fastening mechanism is in position the deformable material which has a high coefficient of friction helps prevent the effect of vibration on the fastening mechanism and prevent the bolt from shaking loose as a result of that vibration.

The deformable material having a thread pattern which substantially matches and fits in with the rest of the threaded shaft provides the fastening mechanism of the present invention with a number of significant advantages. These include the following:

The deformable material retains substantially the same shape during and after 'doing up' or 'undoing' the fastening mechanism. This is important as it decreases the forces on the deformable material, thereby increasing its effectiveness and reusability.

This also increases the ease with which the fastening mechanism can be fastened, and/or unfastened while maintaining consistent contact between the fastening mechanism and its opposite member (complementary threads or material).

Having the threads of the non-deformable material interspersed with threads of a deformable material, preferably along the entire length of the shaft provides an increased friction fit of the fastening mechanism with its opposite member along the length of, and/or around the circumference of the fastening mechanism. This again increases the resistance of the fastening mechanism to vibration.

In cases where the deformable threads extend around or are positioned around the circumference of the shaft also means that the fastening mechanism is equally resistant to vibration from all angles.

If the deformable material does not extend around the entire outer circumference of the fastening mechanism as in the Long-Lok prior art product then vibration on a particular plane in which there is no deformable material present may not be resisted. This situation may be overcome with the present invention by the deformable threads having at least one greater external diameter than adjacent non-deformable threads, or the deformable threads having a rounded or U-shaped thread rather than a tapered thread.

The configuration of the deformable material in the present invention also increases the surface area of binding. This again increases the friction fit, reliability and vibration resistance of the present invention.

The feature of the deformable threads being integral with the non-deformable threads results in the deformable material having a thicker cross-section when compared to prior art patches, such as a thin patch or insert into the longitudinal side of a shaft.

This overcomes a number of significant disadvantages associated with the prior art, and especially products in the form of patches sprayed onto a fastening mechanism. With the present invention the thickness of the deformable material, its thread pattern and its integration with the non-deformable material along the shaft means that there are no thin edges of the deformable material which may become tatty or disassociated from the shaft.

In one embodiment the shaft may include only one integral portion of a deformable material. This may include one portion of deformable material which extends along the path of, and effectively replaces what would be at least one non-deformable thread of the shaft in a conventional bolt.

The non-deformable threads on the shaft may in some embodiments be positioned along the shaft in groupings. For example, there may be a 5 thread spiral of the non-deformable material with gaps between each of the 5 threads, into which a thread of deformable material is inserted or positioned.

In one preferred embodiment the shaft may include at least a grouping or pair of threads, with one or more thread being of non-deformable material, and one or more threads being of deformable material.

This embodiment, along with other embodiments of the present invention provides all the required characteristics; the non-deformable thread(s) provide the strength of the fastening mechanism, and the deformable thread(s) or portions thereof provide the desired anti-vibration effect. The present invention therefore addresses and overcomes the two major problems associated with existing fastening mechanisms—mechanical failure and vibratory loosening.

It should be appreciated that there is a required balance between the number/proportion of the thread(s) which are of non-deformable material, and those threads of a deformable material.

The balance is to provide a fastening mechanism which provides enough deformation (via the deformable material) to resist loosening due to vibration, however, the fastening mechanism must not have so much deformation that it weakens the thread(s) to a significant extent.

If there is too high a proportion of deformable material then there is a greater chance of the non-deformable threads being stripped with tightening or in use. Therefore too high a proportion of deformable material may increase the risk of mechanical failure.

In a preferred embodiment this balance may be more easily met if the deformable threads are spaced out along the shaft, for example, when there are specific threads, or portions of deformable material, next to threads of non-deformable material.

The balance required, and optimum proportions of non-deformable and deformable material will depend on the end use of the fastening mechanism, the required strength requirements and expected level of vibration resistance required.

In alternative embodiments the shaft may include multiple integral portions of a deformable material interspersed along its length. This is especially the case when the shaft includes segments of threaded non-deformable and deformable material.

In some embodiments the integral deformable material segments (or threads) may in total make up approximately half of the length of the threaded shaft.

In preferred embodiments the deformable threads may be either right or left handed depending on the direction of the non-deformable threads on the shaft.

According to another aspect of the present invention there is provided a kitset, the kitset including,
 a fastening mechanism substantially as previously described, and
 a complementary fastening mechanism.

In a preferred embodiment the fastening mechanism may be a bolt, and/or nut which has a non-deformable threaded shaft, interspersed with at least one portion of a threaded deformable material.

In a preferred embodiment the complementary fastening mechanism may be a nut (or bolt) with complementary threads to those of the fastening mechanism. In some embodiments both the bolt and the nut may include interspersed deformable threaded portions.

In one embodiment the deformable material may be manufactured independently from the rest of the threaded shaft. The deformable material may then be attached to the threaded shaft via a variety of known methods.

During manufacture of the fastening mechanism the threads of the non-deformable and deformable material are securely and permanently attached to one another to form the integral fastening mechanism of the present invention.

In a preferred embodiment the threaded non-deformable material may be manufactured such that it winds in a helical manner along the shaft leaving a space or gap into which the deformable material can be inserted.

In one embodiment the threaded non-deformable material may include a portion which interacts with, and is capable of maintaining the deformable material in the correct position. This connection must be strong enough to provide high reliability and reusability under the conditions of use.

For example, in one embodiment the threaded non-deformable material may include a helical recess, which may be dovetailed in cross section. In this case the dovetail would be widest at the base of the thread, with a cross section generally perpendicular to the helical path of the threads.

In one preferred embodiment the deformable material may then be injection moulded into the recess of the non-deformable material.

One skilled in the art would be aware of other suitable methods of 'attaching' the deformable and non-deformable materials together to form an integral fastening mechanism of the present invention.

According to another aspect of the present invention there is provided a method on manufacturing a shaft for a fastening mechanism substantially as herein described, the method including the steps of:
  a) manufacturing a threaded shaft from a non-deformable material, with at least one gap configured to receive a deformable material,
  b) manufacturing a threaded deformable material configured to fit into the gap(s) in the non-deformable material, and
  c) fitting the deformable material into the gap(s) in the non-deformable material such that an integral shaft is formed from the non-deformable and deformable materials.

It should be appreciated that in some embodiments the threaded shaft may have a solid core into which the threads of non-deformable material, and/or gaps configured to receive deformable material are cut.

It should be appreciated that the term fitting may include other methods of 'attaching' the deformable material to the gap(s) in the non-deformable material, these may include for example fitting by any means, casting or extruding.

In one embodiment the non-deformable threads of the shaft may consist of a spiral cut into a solid core. One or more gaps may be formed between the non-deformable threads into which the deformable material may be fitted. The gaps in which the deformable material may be inserted may extend partially or fully through the threaded shaft.

It should be appreciated that the deformable material may be either manufactured in the shape of a thread which extends throughout the shaft, or may be manufactured in the shape of a strip which fits into a gap cut or manufactured into the shaft either separately, or in situ.

In a particularly preferred embodiment the deformable material may be injection, moulded, or otherwise moulded into the gap(s) in the non-deformable material.

In an alternative embodiment the shaft may consist of separate segments of threaded non-deformable material into which are interspersed segments of deformable material also with the same threaded pattern.

In a preferred embodiment the deformable material contains the same threaded pattern as the rest of the threaded shaft.

This allows quick and easy insertion or removal of the fastening mechanism.

In a preferred embodiment the deformable material may retain substantially its own shape throughout insertion and when positioned in the correct place. This allows the fastening mechanism of the present invention to be highly reusable.

It should be appreciated that the threaded pattern along the length of the screw or bolt is regular or decreasing in size as per a standard thread on a bolt or screw. The integral portions of deformable material match and fit in with these thread patterns.

It should be appreciated that the deformable material is preferably of a type and structure that possesses a material memory. This means that if the material is deformed when force is placed on it, there is a natural tendency for the material memory to bias the deformable material back towards its original shape.

Thus in use, the bolt in accordance with the present invention has a shaft which has threads in a normal position as a standard bolt.

When the bolt is screwed onto a nut or other fastening feature the deformable material may compress slightly and deform. However, the natural memory of the material causes the material to extend outwards in an attempt to resume its original shape.

Once in position the bias of the deformable material towards its original shape and its high co-efficient of friction provides a close friction fit with the complementary thread of the nut and thereby provides resistance to vibration. During the 'doing up' or 'undoing' action of the bolt the deformable material may compress slightly making it easier to do up or undo.

It should be appreciated that the above terms are only used as one example. The action of the present invention can be used to screw into other materials, whether threaded or unthreaded. However, the basic principles remain the same in that the integral deformable material portions act to provide friction fit, thereby decreasing the effect of vibration.

The fastening mechanism of the present invention provides a significant number of advantages over fastening mechanisms of the prior art. These include the following:
  The fastener of the present invention is highly resistant to vibration; this is provided by the inclusion of threads formed out of a deformable material on a threaded shaft.
  The deformable material is integral with the non-deformable threads, this provides greater strength and reliability to the fastener, and overcomes problems associated with the thin edges of prior art patches which may become tatty or start to disassociate from the threaded shaft.
  Having at least one external dimension of the deformable threads greater than those of non-deformable material again increases the effectiveness and resistance to vibration.
  Having the deformable material positioned across a cross section of the shaft, or around same allows the fastener to be resistant to vibration from all angles.
  Having the deformable material arranged in the helical form allows it to compress and deform elastically in a more defined and predictable manner, which avoids permanent damage or deformation, and allows reuse of the fastener.
  The present invention is ideal for a very wide range of applications; these may include industrial or building uses, use in vehicles or other forms of transport and in any other device which requires fastening and vibration resistance, for example use as the rim closure screws which serve to retain the spectacle lens in a pair of eyeglasses.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Figure 1:
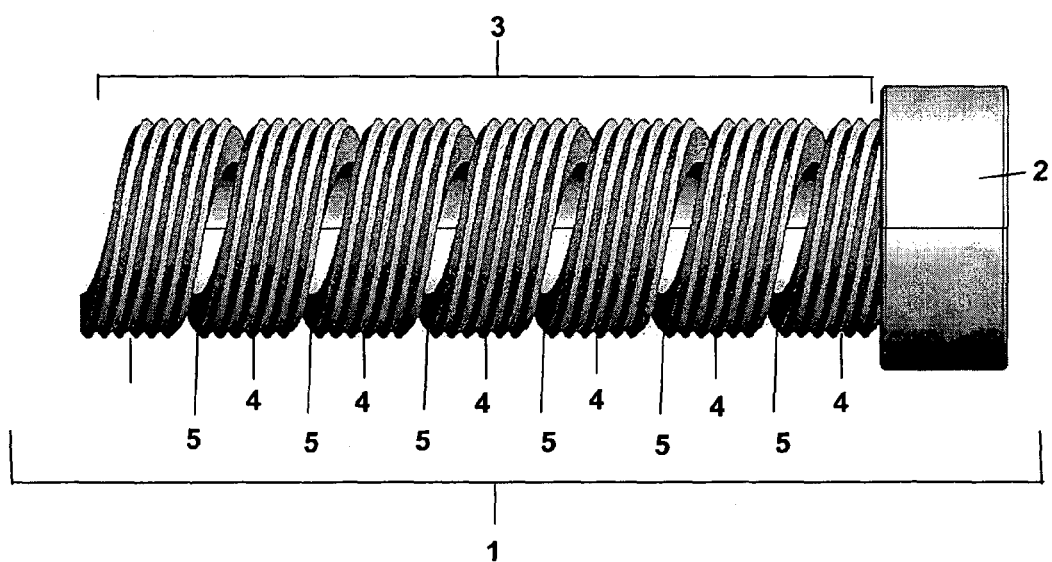
FIG. 1 shows one embodiment of the fastening mechanism showing the non-deformable threads of the shaft without the deformable material threads.

FIG. 1 shows an example of one embodiment of the present invention. In FIG. 1 the integral portion of deformable material is in the place of at least one of the threads down the entire length of the threaded shaft.

FIG. 1 shows the fastening mechanism (1), which includes a head (2) and a threaded shaft (3).

The threaded shaft (3) incorporates a spiral of non-deformable threads (4) extending along the length of the shaft (3), and a gap (5) in the non-deformable threads into which the deformable material is inserted and attached. The deformable material is not shown in this figure.

Figure 2:
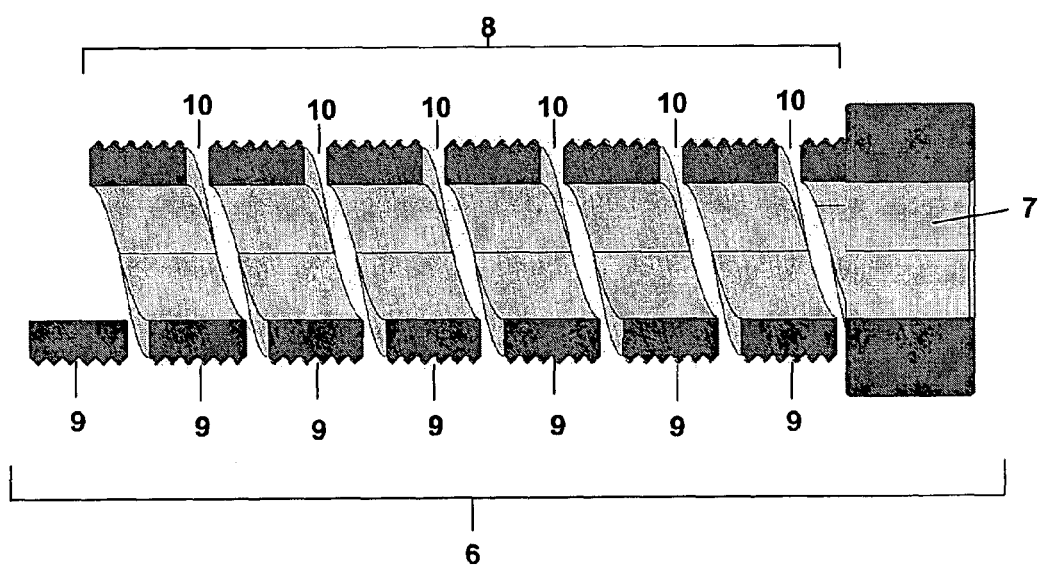
FIG. 2 shows a second embodiment of the fastening mechanism showing the non-deformable threads of the shaft without the deformable material threads when the shaft is segmented.

FIG. 2 shows an example of another embodiment of the present invention where the integral portion of deformable material 'replaces' sections of the non-deformable threaded shaft at regular intervals along the shaft.

FIG. 2 shows the fastening mechanism (6), which includes a head (7) and a threaded shaft (8).

As can be seen in FIG. 2 the threaded shaft is made in segments (9) of non-deformable material. Between each segment is a gap (10). Portions of threaded deformable material are inserted and attached in each gap (10) of the shaft. The deformable material is not shown in this figure.

Figure 3:
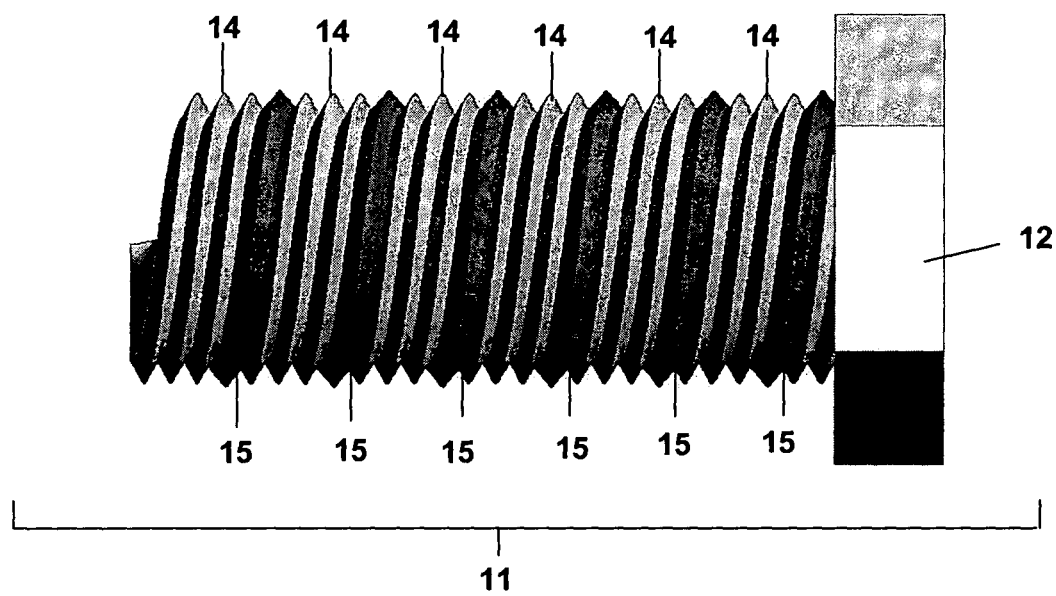
FIG. 3 shows an embodiment of the fastening mechanism showing both threads of non-deformable and deformable material.

FIG. 3 shows an example of the fastening mechanism with the deformable material interspersed along the non-deformable threaded shaft.

FIG. 3 shows the fastening mechanism (11) having a head (12) and threaded shaft (13).

The threaded shaft is made up of non-deformable threads (14) and threads made out of deformable material (15).

The threads made out of the deformable material (15) are interspersed regularly throughout the non-deformable threads (14). This may be due to either of the construction methods as shown in FIGS. 1 and 2.

As can be seen in FIG. 3 the threads made out of the deformable material (15) extend slightly further than the non-deformable threads, and are slightly wider (14), i.e. the deformable threads have at least one external dimension which is greater than that of adjacent non-deformable threads. This allows for compression of the deformable material and an increase friction fit against the opposite member.

Figure 4:
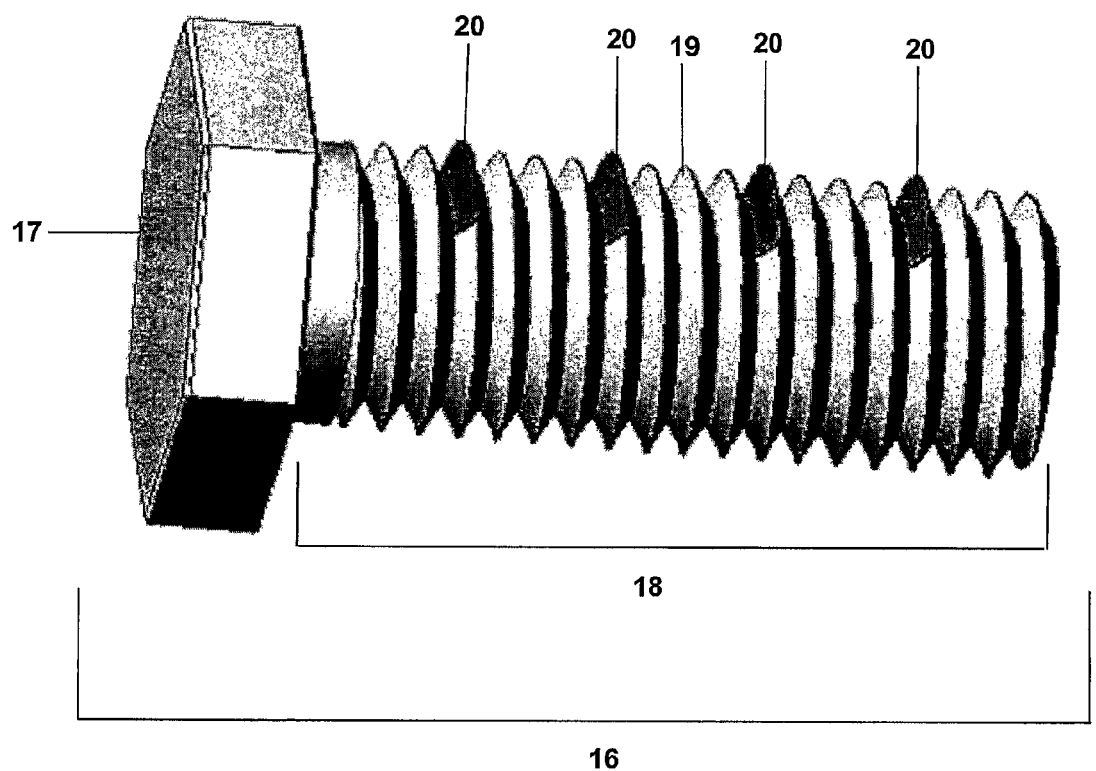
FIG. 4 shows an embodiment of a 1 helix start fastening mechanism, with the non-deformable threads being intermittently interspersed with portions of deformable thread.

FIG. 4 shows the fastening mechanism wherein the threaded shaft is configured such that the non-deformable thread is intermittently interspaced with a portion of threaded deformable material for part of it's helical thread.

FIG. 4 shows the fastening mechanism (16) having a head (17) and a threaded shaft (18).

The threaded shaft (18) is made substantially out of non-deformable material (19) in a 1 start helix.

The non-deformable threads have intermittent portions of deformable material (20). The portions of deformable material (20) are configured in a thread shape, and are thus 'threaded' according to the present invention.

Again, FIG. 4 shows the deformable threads (20) having at least one external dimension which is greater than that of adjacent non-deformable threads. In this case the deformable threads have a greater length (extend further from the central axis of the shaft than adjacent non-deformable threads). They may also be wider.

FIG. 4 shows the deformable portions all positioned on one side of the shaft. This is not necessary—these may be spread around the circumference of the shaft, or be positioned on more than one side.

Figure 5:
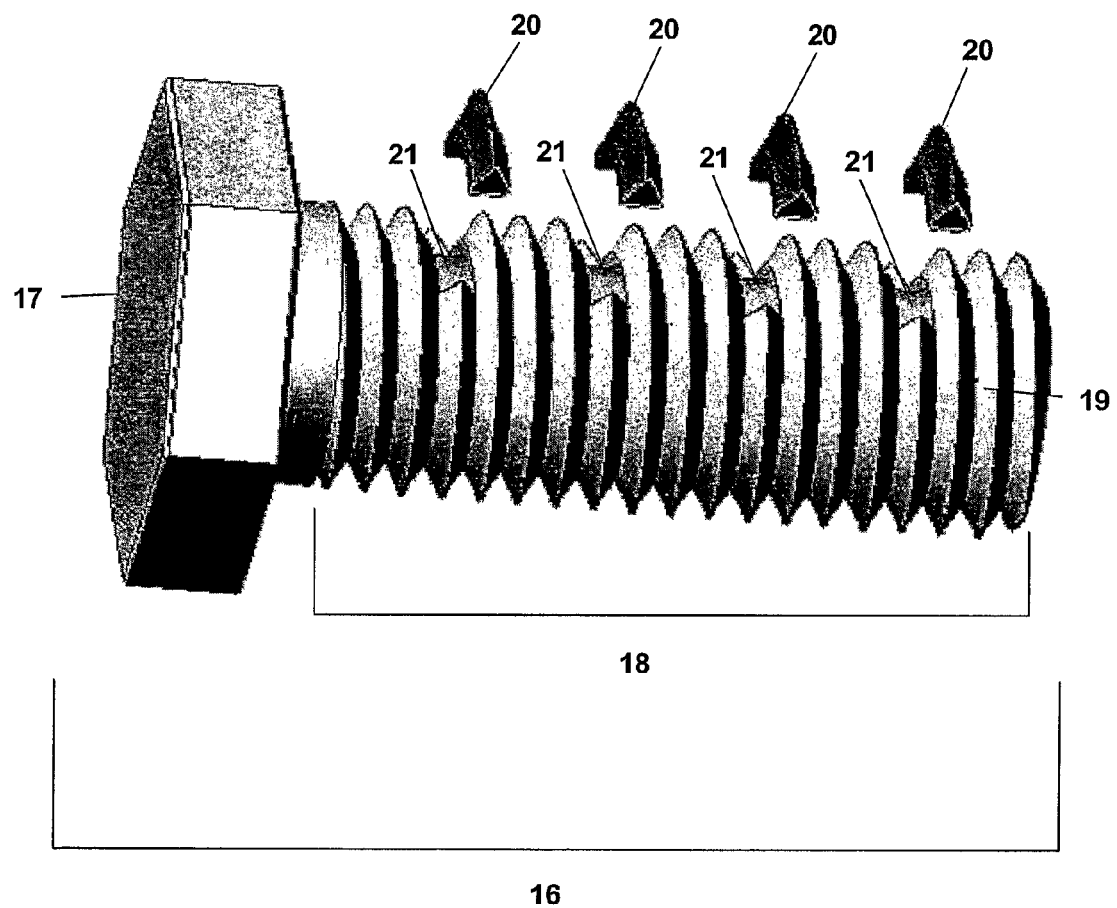
FIG. 5 shows a further schematic of the fastening mechanism as shown in FIG. 4.

FIG. 5 shows an expanded version of the schematic shown in FIG. 4. The numbering used in FIG. 5 is the same as that used in FIG. 4. FIG. 5 shows the non-deformable threaded shaft (19) with gaps left in for the insertion and attachment of the deformable portions (20).

Aspects of the present invention have been described by way of example only and it should be appreciated that modifications and additions may be made thereto without departing from the scope thereof as defined in the appended claims.

What I claim is:

1. A fastening mechanism, comprising: a shaft, wherein the shaft is effectively threaded; and
    the shaft includes a thread of a non-deformable material interspersed with a thread of a deformable material; and
    wherein at least one external dimension of the deformable thread is greater than that of the non-deformable thread and the threads of non-deformable material and deformable material are continuous to encircle the shaft along at least part of its length.

2. The fastening mechanism as claimed in claim 1, wherein a thread pattern of the deformable material is configured to substantially match a thread pattern of the non-deformable material.

3. The fastening mechanism as claimed in claim 1, wherein the threads are formed in groups of non-deformable and deformable material.

4. The fastening mechanism as claimed in claim 1, wherein the at least one external dimension of the deformable thread is greater than that of an adjacent non-deformable thread.

5. The fastening mechanism as claimed in claim 1, wherein the shaft is the exterior surface of a bolt.

6. The fastening mechanism as claimed in claim 5, wherein the shall also includes a head.

7. The fastening mechanism as claimed in claim 1, wherein the shaft is the interior surface of a nut.

8. A method of fastening comprising: using a fastening mechanism as claimed in claim 1.

9. A kitset comprising:
    a fastening mechanism, comprising: a shaft, wherein the shall is effectively threaded; and
    the shaft includes a thread of a non-deformable material interspersed with a thread of a deformable material; and
    wherein at least one external dimension of the deformable thread is greater than that of the non-deformable thread and the threads of non-deformable material and deformable material are continuous to encircle the shaft along at least part of its length, and
    wherein said shaft is provided in one of a bolt and a nut; and
    a complementary fastening mechanism including a nut when said shaft is provided in a bolt, and a bolt when said shaft is provided in a nut.

10. A method of manufacturing a fastening mechanism including a shaft, wherein the shaft is effectively threaded; and the shaft includes a thread of a non-deformable material interspersed with a thread of a deformable material; and wherein at least one external dimension of the deformable thread is greater than that of the non-deformable thread and the threads of non-deformable material and deformable material are continuous to encircle the shaft along at least part of its length the method comprising:

a) manufacturing a threaded shaft from a non-deformable material with at least one gap configured to receive a deformable material;

b) manufacturing a threaded deformable material configured to fit into the at least one gap in the non-deformable, material; and c) fitting the deformable material into the at least one gap in the non-deformable material such that an integral shaft is formed from the non-deformable and deformable materials.

* * * * *